Aug. 12, 1958   A. E. STRAUSSER   2,846,772
WEDGE-SHAPED RULE
Filed Feb. 12, 1954
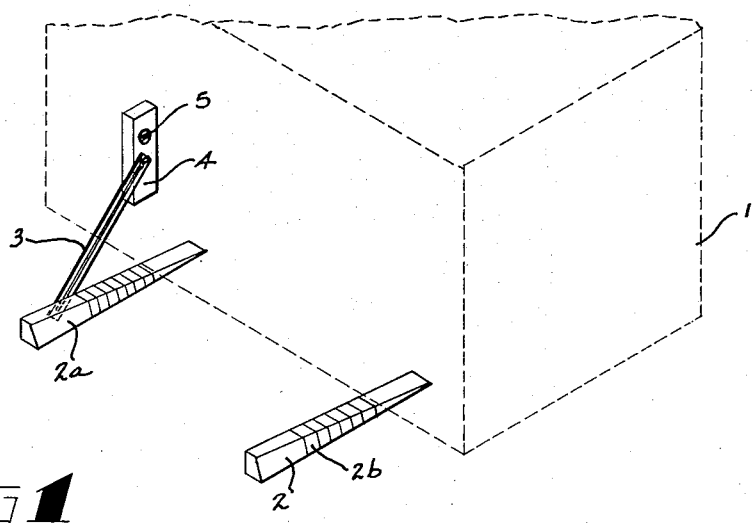
FIG 1
FIG 2
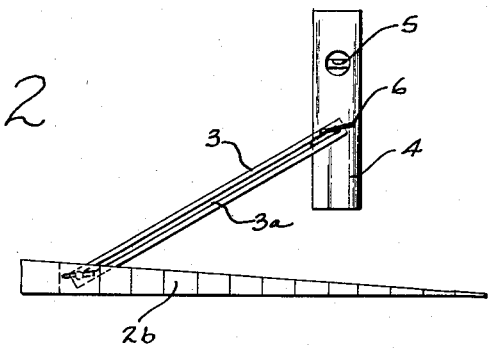
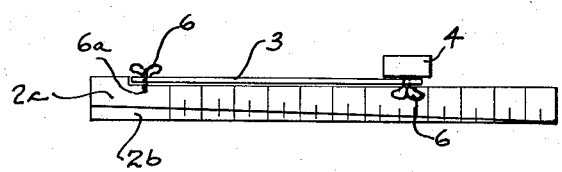
FIG 3
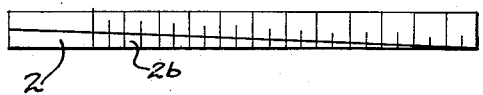
FIG 4
INVENTOR
ARLAN E. STRAUSSER
BY *William J. Ruano*
ATTORNEY

United States Patent Office 2,846,772
Patented Aug. 12, 1958

2,846,772

WEDGE-SHAPED RULE

Arlan E. Strausser, Reading, Pa.

Application February 12, 1954, Serial No. 409,842

2 Claims. (Cl. 33—174)

This invention relates generally to a measuring device having a wide variety of uses, and, more particularly, relates to a wedge-shaped rule for easily obtaining vertical or other measurements, such as in a house, which measurements are extremely difficult to take with ordinary rules.

In the use of ordinary rules, great difficulty is encountered in making measurements underneath a sink cabinet or other unit which must be installed plumb and which requires inserts of measured height underneath to compensate for sloping floors and the like because of modern designs of such units which include bases which are inset and whose front panels extend closely to the floor. Also, difficulty is encountered in making calculations resulting from such measurements pertaining to the thickness of inserts which must be placed underneath the cabinet to compensate for the slope of the floor.

An object of my invention is to provide a measuring device, including a wedge-shaped rule, which will overcome the above named disadvantages and which is useful for a wide variety of measurements and for leveling.

A more specific object of my invention is to provide a wedge-shaped rule having surfaces which can be easily read and which surfaces are calibrated so as to facilitate measurements relating to slopes of irregular bases, such as floors, base structural elements and the like.

A still more specific object of my invention is to provide a novel wedge-shaped rule and hinged level assembly for determining the height of insert necessary for compensating for floor irregularities and slopes when installing cabinets, refrigerators or parts of the framing of a building in vertical or plumb relationship in spite of a sloping floor or base.

Other objects and advantages will become more apparent from a study of the following description taken with the accompanying drawing wherein:

Figure 1 is a perspective view of a wedge-shaped rule used alone, and of a wedge-shaped rule used in combination with a winged attachment, involving the principles of my invention and inserted underneath a sink cabinet, shown in dotted lines, for making measurements necessary to level the cabinet to compensate for a sloping floor.

Figures 2 and 3 are top and side views respectively, somewhat enlarged, of one of the wedge-shaped rules shown in Figure 1 and;

Figure 4 is a top view, somewhat enlarged, of the other wedge-shaped rule shown in Figure 1.

Referring more particularly to Figure 1, numeral 1 denotes in dotted outline a portion of a sink cabinet, refrigerator base or similar appliance or unit which must be installed in level condition, that is, with its wall plumb in spite of irregularities or sloping of the floor. Numeral 2 generally denotes a wedge-shaped rule embodying the principles of my invention. Numeral 2a shows the same rule except that it is in combination with a hinged element 3 having a winged attachment 4 on which is mounted horizontally a cross level 5. On the side face 2b of the rule are graduations in inches, extending from zero near the thickest end to 12 inches at the extremity or point. Preferably side surface 2b is sloped downwardly and outwardly as shown in order to facilitate reading of its graduations from above. It may also be desirable to taper such slope from a maximum at the highest or thickest end of the rule to zero at the point, as shown more clearly in Figures 3 and 4. And on the top surface 2c are 16 graduations (although fewer are shown in the drawing for purposes of clarity) extending between these same limits, that is, over a 12-inch length, but calibrated to indicate $\frac{1}{16}$ inch of rise and extending from zero at the point of the rule $16/16$ at the zero calibration of the 12-inch rule on side surface 2b, thus indicating a rise of $\frac{1}{16}$ inch for every $\frac{3}{4}$-inch. Of course, the calibration might be changed so as to indicate, for example, a rise of one inch to one foot.

The wedge rule may be used either alone or in combination with a winged attachment, both as shown in Figure 1. The winged attachment comprises an extension 3 having a longitudinally extending central groove 3a and having one end pivotally mounted on an end of a cutout side portion of the wedge rule and having its other end pivotally connected to a member 4 which supports a cross level 5 as hereinabove described. Member 4 is slidably mounted on extension 3 and may be clamped either to the end or to an intermediate position thereof by means of a winged nut 6 and bolt 6a which extends therethrough and through member 4. Member 4 and extension 3 may be pivotally collapsed and nested into the side grooved portion of the rule when not in use to facilitate carrying. Although shown somewhat enlarged for the purpose of clarity, member 4 may actually be small enough in size to extend below the top surface of the rule when in collapsed condition so as to be invisible from the side as viewed in Figure 2.

In operation, the wedged rule may be used alone by sliding the pointed end underneath a cabinet, or the like, while the cabinet is held in a level position, and until the top edge of the rule engages the bottom of the cabinet. Then by reading the top scale at the point of contact with the cabinet an indication will be given as to the rise in sixteenths of an inch, therefore which is indicative, by comparison with the floor measurement of the slope of the floor as well as the thickness of insert necessary for placement underneath the cabinet to insure that the walls will be vertical even though the floor is sloped or otherwise irregular.

In the use of the winged attachment, the member 4 may be placed against the front wall of the cabinet and the cabinet may be tilted until level 5 is centered, indicating that the walls are directly vertical, at which moment the top face of the rule may be read to see at what point it contacts the bottom surface of the cabinet to indicate degree of slope or rise of the floor, so that the proper thickness of insert may be later placed underneath the legs of the cabinet to compensate for the slope of the floor.

With the above described wedged rule or wedged rule and attachment, measurements may be quickly and easily obtained in a wide variety of uses, such as to hold a work or object in proper position of alignment while provisions are being made for permanent installation. If the inclination is in opposite or both directions or if it is desirable to level over a curved surface, the wedged rule may be used to obtain the full measurement required to solidly set the object by subtracting the measurements needed to bring the object to level, the difference being the measurement needed on the opposite side.

The wedge-shaped rule may be made of hardwood, plastic material, metal or other suitable material, depending upon the intended use. The rule may be made of larger sizes and with more graduations as required for different uses.

The wedge-shaped rule may be used in construction work such in setting of window and door frames, joists and roof rafters and in the hanging of doors. It may also be used in installing fixtures, such as bathroom fixtures and heating equipment. It is particularly useful in remodeling and making alterations where a building has settled and the walls, floors, doors and windows are out of plumb and wherein it is difficult to make measurements for adjustments needed in shoring up. It is also useful in installation work, such as the setting of display fixtures, showcases, restaurant equipment, safes, office equipment, machinery, refrigeration and air conditioning equipment, heating equipment, boilers, ducts, etc.

Thus it will be seen that I have provided an efficient measurement device in the form of a wedge-shaped rule either with or without a level gauge attachment, which rule is useful in a wide variety of applications for compensating for slopes or irregularities of bases or floors and which quickly indicates what compensation is needed to make an object plumb which is rested or supported on such base or floor.

While I have illustrated and described two embodiments of my invention, it will be understood that these are by way of illustration only, and that various changes and modifications may be made within the contemplation of my invention and within the scope of the following claims.

I claim:

1. A triangular-shaped rule which is calibrated on its sloping edge in fractions of an inch to indicate the number of fractions of an inch rise for a given distance from a corner having an acute angle, and a foldable attachment thereon including an extension arm having pivotally connected thereto a level adapted to be held against a vertical surface.

2. A measuring device comprising a rule of substantially wedge shape having a downwardly and outwardly extending side surface, and having a top surface with calibrations of fractions of an inch for every inch along the base of the rule, said rule having a cut-out side portion, and a winged pivotal attachment adapted to be folded and inserted in said cut-out side portion and comprising an arm having an elongated groove, one end of which arm is pivotally mounted on a thick portion of said rule, and a level carrying element pivotally supported on the other end of said arm.

References Cited in the file of this patent

UNITED STATES PATENTS

| | | |
|---|---|---|
| 527,581 | Benson | Oct. 16, 1894 |
| 588,852 | Beatty | Aug. 24, 1897 |
| 2,114,936 | Pilnick | Apr. 19, 1938 |
| 2,399,303 | Thomas | Apr. 30, 1946 |

FOREIGN PATENTS

| | | |
|---|---|---|
| 275,699 | Great Britain | Aug. 15, 1927 |